United States Patent
Chang et al.

(10) Patent No.: US 10,876,037 B2
(45) Date of Patent: Dec. 29, 2020

(54) CONSOLIDATION OF FORMATION PARTICULATES

(71) Applicant: Saudi Arabian Oil Company, Dhahran (SA)

(72) Inventors: Fakuen Frank Chang, Dhahran (SA); Xiaoyu Tan, Hengyang (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/969,286

(22) Filed: May 2, 2018

(65) Prior Publication Data

US 2018/0320055 A1    Nov. 8, 2018

Related U.S. Application Data

(60) Provisional application No. 62/500,152, filed on May 2, 2017.

(51) Int. Cl.
    *C09K 8/575*    (2006.01)
    *E21B 33/13*    (2006.01)
    *C09K 8/565*    (2006.01)

(52) U.S. Cl.
    CPC ............ *C09K 8/5755* (2013.01); *C09K 8/565* (2013.01); *E21B 33/13* (2013.01)

(58) Field of Classification Search
    None
    See application file for complete search history.

(56) References Cited

U.S. PATENT DOCUMENTS

| 3,294,165 A | * | 12/1966 | Meijs et al. | C08G 59/18 166/295 |
| 3,294,166 A | * | 12/1966 | Havenaar | C09K 8/50 166/295 |
| 3,294,168 A | * | 12/1966 | Bezemer | C08J 3/092 166/295 |
| 3,330,350 A | * | 7/1967 | Maly | C09K 8/56 166/288 |
| 3,478,824 A | | 11/1969 | Hess et al. | |

(Continued)

FOREIGN PATENT DOCUMENTS

FR    2734832    12/1996

OTHER PUBLICATIONS

International Search Report and Written Opinion issued in International Application No. PCT/US2018/030241 dated Jul. 4, 2018, 17 pages.

(Continued)

*Primary Examiner* — Anuradha Ahuja
(74) *Attorney, Agent, or Firm* — Fish & Richardson P.C.

(57) ABSTRACT

A polymerizable chemical system for consolidating particulates in a subterranean formation including a liquid resin, a curing agent, and a permeability enhancing additive. The chemical system is a homogenous composition that polymerizes to forms a solid upon heating at a temperature greater than 60° C. Consolidating particulates in a subterranean formation includes providing a polymerizable chemical system comprising a liquid resin, a curing agent, and a permeability enhancing additive to a subterranean formation, and polymerizing the polymerizable chemical system to consolidate particulates in the formation to yield a porous consolidated particulates pack.

11 Claims, 2 Drawing Sheets

(56) References Cited

U.S. PATENT DOCUMENTS

| | | | |
|---|---|---|---|
| 3,560,427 A * | 2/1971 | Bezemer et al. | C08G 8/00 523/132 |
| 4,507,461 A | 3/1985 | Bowditch | |
| 5,368,102 A | 11/1994 | Dewprashad et al. | |
| 6,016,870 A | 1/2000 | Dewprashad et al. | |
| 6,632,778 B1 | 10/2003 | Ayoub et al. | |
| 6,705,400 B1 | 3/2004 | Nguyen et al. | |
| 6,729,404 B2 | 5/2004 | Nguyen et al. | |
| 6,732,800 B2 | 5/2004 | Acock et al. | |
| 6,832,650 B2 | 12/2004 | Nguyen et al. | |
| 6,851,474 B2 | 3/2005 | Nguyen | |
| 7,264,052 B2 | 9/2007 | Nguyen et al. | |
| 2009/0078419 A1 * | 3/2009 | Dusterhoft | C09K 8/50 166/295 |
| 2009/0151943 A1 | 6/2009 | Nguyen et al. | |
| 2010/0160187 A1 * | 6/2010 | Nguyen | C09K 8/50 507/202 |
| 2010/0212905 A1 | 8/2010 | Van Petegem et al. | |
| 2011/0030950 A1 * | 2/2011 | Weaver | C09K 8/68 166/276 |
| 2018/0016489 A1 | 1/2018 | Suzart et al. | |

OTHER PUBLICATIONS

Gulf-Cooperation Council Examination Report issued in GCC Application No. 2018-35235 dated Nov. 14, 2019, 4 pages.
GCC Examination Report in GCC Appln. No. GC 2018-35235, dated Apr. 2, 2020, 3 pages.

* cited by examiner

CONSOLIDATION OF FORMATION PARTICULATES

CROSS-REFERENCE TO RELATED APPLICATION

This application claims the benefit of U.S. Provisional Application No. 62/500,152, filed on May 2, 2017. The entire contents of the foregoing are hereby incorporated by reference.

TECHNICAL FIELD

This disclosure relates to consolidation of formation particulates, for example, particulates in a formation zone from which hydrocarbons can be recovered.

BACKGROUND

A formation or subterranean zone includes multiple layers of sub-surface rock. Hydrocarbons (for example, petroleum, natural gas or combinations of them) are sometimes entrapped in all or portions of the formation zone. The entrapped hydrocarbons can be recovered from the formation zone, for example, through wellbores drilled in the formation zone. In a primary recovery technique, the hydrocarbons flow into the wellbore and toward the surface based on a natural pressure under which the hydrocarbons are trapped in the formation zone. Secondary and tertiary techniques involve stimulating the formation zone to recover the hydrocarbons, for example, using hydraulic fracturing or injection wells to name a few. Sometimes, particulates, for example, earth, sand or other particulates, in the formation zone can flow to the surface with the hydrocarbons.

SUMMARY

This disclosure describes technologies relating to compositions and methods of consolidating particulates in a subterranean formation.

In a first general aspect, a polymerizable chemical system for consolidating particulates in a subterranean formation includes a liquid resin, a curing agent, and a permeability enhancing additive. The chemical system is a homogenous composition that polymerizes to forms a solid upon heating at a temperature greater than 60° C.

Implementations of the first general aspect may include one or more of the following features.

In some implementations, the polymerizable chemical system consists of, or consists essentially of, the liquid resin, the curing agent, and the permeability enhancing additive. The liquid resin may include an epoxy resin. In some examples, the epoxy resin includes, consists of, or consists essentially of bis-phenol A epichlorohydrin. In some examples, the curing agent includes, consists of, or consists essentially of 4, 4'-diaminodiphenyl sulfone. In some implementations, the permeability enhancing additive includes an organic solvent. Suitable organic solvents include methanol, ethanol, acetone, toluene, xylene, propanol, isopropanol, or a mixture thereof. In one example, the organic solvent includes, consists of, or consists essentially of methanol. The chemical system polymerizes in situ in a subterranean formation to consolidate particulates in the formation.

In some implementations, the polymerizable chemical system includes a volume ratio of the liquid resin to the curing agent of 2:1 to 1:2. In one example, a volume ratio of the liquid resin to the curing agent is 1:1. In some implementations, a volume ratio of the combination of the liquid resin and the curing agent to the permeability enhancing additive is in a range of 10:1 to 1:3.

In some implementations, the chemical system polymerizes in situ in a subterranean formation to yield a compound represented by the following formula:

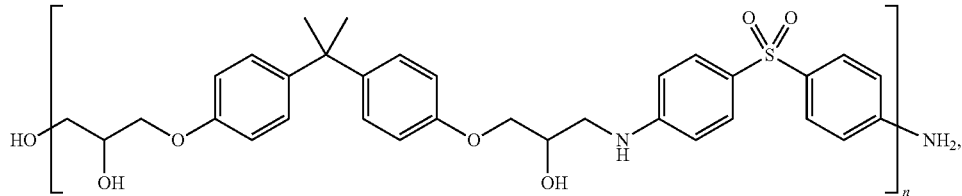

where n is an integer in a range of 5 to 25.

In a second general aspect, consolidating particulates in a subterranean formation includes providing a polymerizable chemical system including a liquid resin, a curing agent, and a permeability enhancing additive to a subterranean formation, and polymerizing the polymerizable chemical system to consolidate particulates in the formation to yield a porous consolidated particulates pack.

Implementations of the second general aspect may include one or more of the following features.

Some implementations of the second general aspect include flushing the subterranean formation with a liquid pre-flush composition including an organic liquid before providing the polymerizable chemical system to the subterranean formation. The organic liquid may include at least one of decane, dodecane, kerosene, diesel, and mineral oil. In some examples, the organic liquid includes, consists of, or consists essentially of diesel. The particulates typically include at least one of sand, carbonate particles, fine-grain clay particles, anhydrite, barite, and oxides of iron, calcium, and magnesium.

Some implementations of the second general aspect include flushing the subterranean formation with a liquid post-flush composition after providing the polymerizable chemical system to the subterranean formation, thereby displacing the chemical system in the formation. The liquid post-flush composition may be an organic liquid, an aqueous liquid, or a mixture thereof. In some examples, the liquid post-flush composition is an aqueous liquid, such as water or brine. In some examples, the liquid post-flush composition is an organic liquid, such as decane, dodecane, kerosene, diesel, mineral oil, or a combination thereof. The organic liquid may include, consist of, or consist essentially of diesel.

In some implementations, the second general aspect further includes providing the polymerizable chemical system to the subterranean formation via a well, and shutting in the well. Shutting in the well may include shutting in the well for a length of time based at least in part on a temperature of the subterranean formation. In some examples, shutting in the well includes shutting in the well for at least 168 hours when the temperature of the subterranean formation is at least 60° C., or shutting in the well for at least 48 hours when the temperature of the subterranean formation is at least 90° C.

The polymerizable chemical system has a low viscosity, reacts quickly to bind particulates in the formation, and provides high thermal and chemical stability under well conditions. The chemical system, before and after polymerization, is insoluble in water and adheres well to particulates in the formation to yield a permeable, high strength consolidated particulates pack.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
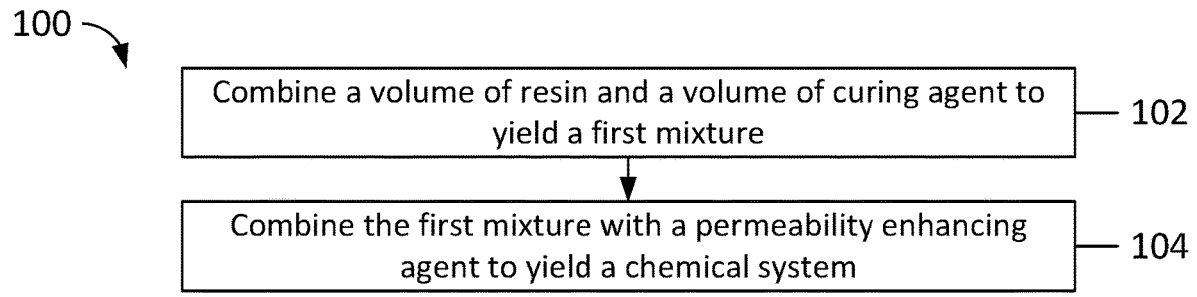
FIG. 1 is a flowchart of an example of a process for making the chemical system.

Sub-surface rock formation can become deconsolidated, for example, by water injection, when cementing material in the natural sandstone dissolves. The deconsolidation can be severe if the indigenous rock mass is originally weak. In a producing well, a weakened or deconsolidated formation can release formation particulates, such as sand, carbonate particles, fine-grain clay particles, and other minerals such as sulfates of calcium (anhydrite), barium (barite), and oxides of iron, calcium, and magnesium, with the hydrocarbons being produced. In an injection well, the formation particulates can cause a decline in injectivity and necessitate an expensive clean out operation.

This disclosure describes a chemical system including a resin, a curing agent, and a permeability enhancing additive. The chemical system typically includes from 10 vol % to 25 vol % resin, from 10 vol % to 25 vol % curing agent, and from 50 vol % to 80 vol % permeability enhancing additive. The resin is polymerizable, and is typically in the form of a liquid. The curing agent and the permeability enhancing additive are also typically in the form of a liquid. The chemical system usually does not harden at a temperature less than 60° C., and thus can be stored prior to use. However, the resin can polymerize with temperature and time upon reacting with the curing agent, such that the chemical system hardens and consolidates particulates under typical formation temperatures (such as greater than 90° C.). When implemented in a formation, the chemical system forms a strong bond among the formation particulates, resulting in a consolidated particulate pack. Because the resin is insoluble in water, continuous injection of water in the formation will not result in deconsolidation of the particulate pack. The thermal and chemical stability of the chemical system can withstand tough underground conditions. As such, the consolidated particulate pack may remain intact for an extended time. In some cases, the strength of the consolidated particulate pack exceeds the strength of the original rock.

The resin forms strong physical or chemical bonds with the formation particulates and has a glass transition temperature that exceeds the target reservoir temperature by at least 50° C. The resulting composite that includes formation particulates bound by the hardened chemical system, thereby inhibiting significant deformation under earth stress loading. An example of a suitable resin is bis-phenol A epichlorohydrin, depicted below, where n is an integer from 5 to 25.

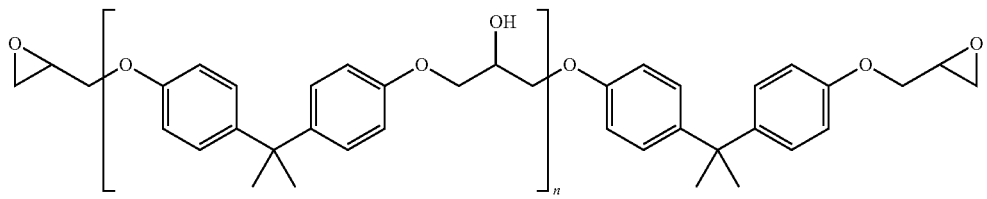

The curing agent reacts with the polymerizable resin to solidify and bind the formation particulates. Suitable curing agents react quickly with the resin at the formation temperature to form a polymer having high strength and stability in situ. An example of a suitable curing agent is 4, 4'-diaminodiphenyl sulfone, depicted below.

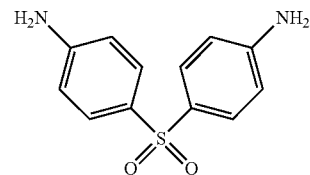 [SMILES: Nc1ccc(S(=O)(=O)c2ccc(N)cc2)cc1]

The permeability enhancing additive promotes permeability of fluid flow. The permeability enhancing additive also reduces the viscosity of the resin, thereby yielding a lower viscosity fluid that can be pumped into the formation, for example, to a location at which the formation particulates are to be consolidated. Thus, the permeability enhancing additive increases the injectivity of the chemical system. In some cases, the permeability enhancing additive in the chemical system maintains open pore space between the particulates, resulting in a consolidated mass with a high permeability to the flow of fluid, such as the hydrocarbons being produced. The additive may separate from the cured resin, remaining in liquid form and filling the pore space, thereby preserving the permeability of the consolidated formation particulates.

In some embodiments, two or more permeability enhancing additives are combined with the chemical system. In certain embodiments, two or more permeability enhancing additives are combined sequentially with the chemical system. In one example, a first permeability enhancing additive is combined with the chemical system before the chemical system is provided to the formation, and a second permeability enhancing additive is combined with the chemical system in the formation before the chemical system solidifies. The two or more permeability enhancing additives may be the same or different.

The concentration of the permeability enhancing additive can be varied to affect the consolidation strength of the consolidated parculates pack and the permeability of the consolidated formation particulates. A trade-off between the consolidation strength of the consolidated particulate pack and the permeability of the consolidated formation particulates can be achieved by varying a concentration of the permeability enhancing additive. In one example, the concentration of the permeability enhancing additive is inversely related to (for example, inversely proportional to) the strength and directly related to (for example, directly proportional to) permeability. Suitable permeability enhancing additives typically include volatile organic solvents, such as methanol, ethanol, acetone, toluene, xylene, propanol, and isopropanol.

In some embodiments, a surfactant is combined with the resin, the curing agent, and the permeability enhancing additive to create a foam that entrains air bubbles. The chemical system promotes consolidation of the particulates in the formation, with air bubbles occupying the pore space to increase permeability.

The chemical system is typically stable at ambient conditions (for example, 15° C. to 25° C. and 1 atm) for at least 15 to 30 days. Thus, curing of the chemical system is temperature delayed until the chemical system is provided to a formation. The solidified resin is thermally and chemically stable in a subterranean formation insoluble in water, and adheres well to the particulates. The chemical structure of an exemplary solidified resin formed from bis-phenol A epichlorohydrin, 4, 4'-diaminodiphenyl sulfone, and methanol is depicted below, where n is an integer from 5 to 25. The use of bis-phenol A epichlorohydrin as the resin and 4, 4'-diaminodiphenyl sulfone as the curing agent results in a resin with a strong bonding capability, even if the thickness of the coating layer on the formation particulates is small. In some examples, a thickness of the coating layer is about 0.02 mm to about 0.1 mm. As such, an increase in the concentration of methanol to increase the permeability of the consolidated formation particulates will not significantly decrease the strength of the consolidation.

The disclosed chemical consolidation system is typically more cost effective than a mechanical sand control system, which uses screen and gravel packs. The mechanical sand control system is relatively passive because the particulates from the formation are trapped by gravel and screen but mobilized with production fluid. The chemical treatment system is an active treatment because it immobilizes the particulates. The chemical treatment system is inert to injected fluids such as water, acids, and other well treatment chemicals and is also non-reactive with produced oil and gas. Thus, the chemical treatment system is more of a lasting fix. The chemical treatment system provides thermal and chemical stability, even at underground conditions, so that lasting consolidation is achieved by this system.

FIG. 1 is a flowchart of an example of a process 100 for making the chemical system. In 102, a volume of the resin and a volume of the curing agent are combined to yield a first mixture. The first mixture is a homogenous solution. The homogeneous solution typically has a viscosity from 1 cP to 10 cP 25° C. In some embodiments, the resin and the curing agent are combined in a volume ratio in a range of 2:1 to 1:2 to yield a first mixture. In certain embodiments, an equal volume of the resin and the curing agent are combined to yield the first mixture. In 104, the first mixture is combined with a permeability enhancing agent to yield the chemical system. The first mixture and the permeability enhancing agent are typically combined in a volume ratio from 10:1 to 1:3 (for example, 5:1, 3:1, 2:1, 1:1, or 1:2). A greater ratio of the first mixture to the permeability enhancing additive typically yields a stronger composite pack, while a lesser ratio of the first mixture to the permeability enhancing additive typically yields a greater permeability. A 1:3 volume ratio of the first mixture to the permeability enhancing additive yield a consolidated particulate pack with a strength that exceeds the strength of the original formation rock. In some embodiments, the resin, the curing agent, and the permeability enhancing additive are combined together in any order. In one example, the curing agent and the permeability enhancing additive are combined to yield a first mixture, and the resin is combined with the first mixture to yield the chemical system.

Figure 2:
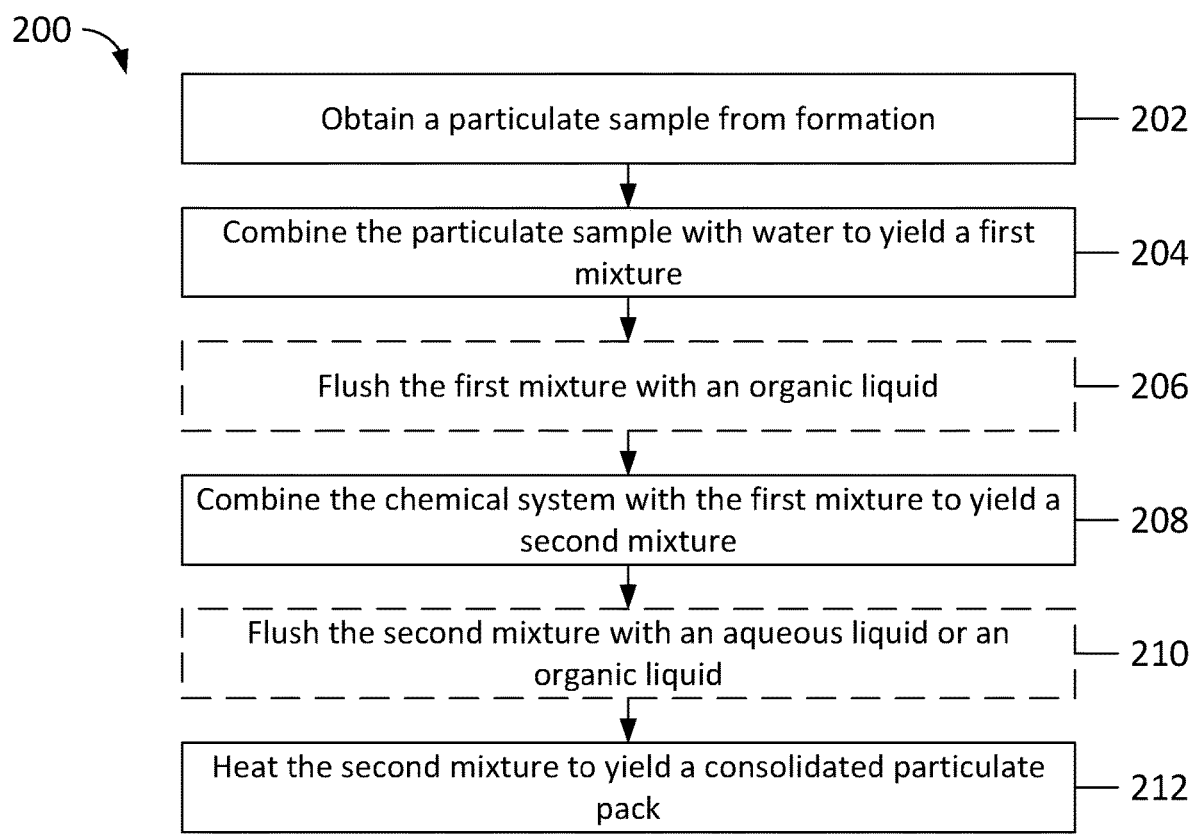
FIG. 2 is a flowchart of an example of a process for testing a pack of consolidated formation particulates made using the chemical system.

FIG. 2 is a flowchart of an example of a process 200 for testing a consolidated formation particulate pack made using the chemical system.

In 202, a particulate sample is obtained from a formation to prepare a field particulate sample. In some embodiments, the particulate sample includes or consists of sand.

In 204, the particulate sample is combined with water to yield a mixture of sand and water, thereby simulating an injection well.

In 206, the mixture of sand and water is optionally flushed (pre-flushed) with an organic liquid. The organic liquid serves to separate the chemical system, which is insoluble in

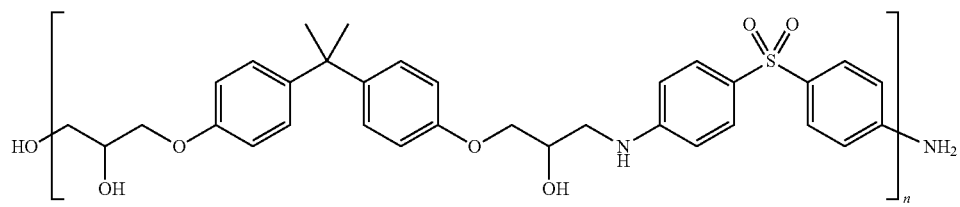

water, from water in the first mixture. Suitable examples of organic liquids include decane, dodecane, kerosene, diesel, and mineral oil.

In 208, the chemical system including the resin, curing agent, and permeability enhancing additive is combined with the first mixture to yield a second mixture. In some embodiments, combining the chemical system with the first mixture includes injecting the chemical system into the first mixture. The second mixture may be saturated with the chemical system.

In 210, the second mixture is optionally flushed (post-flushed) with an aqueous liquid or an organic liquid. Suitable examples of aqueous liquids include water, with and without dissolved salts. Suitable examples of organic liquids include decane, dodecane, kerosene, diesel, and mineral oil. In the field, the fluid of the post-flush enters the formation, displacing the chemical system and thereby coating the particulates with the chemical system and increasing pore space between the particulates. The coated particulates are held together with the chemical system without filling pore space between the particulates. Thus, a post-flush typically increases permeability of a consolidated particulate pack.

In 212, the second mixture, which may or may not have been post-flushed, is heated for a length of time to solidify the chemical system a consolidated particulate pack. In some implementations, the second mixture is heated to a temperature of at least 60° C. for at least five days or in at least 90° C. for at least 12, 24, or 48 hours. The rate of solidification typically increases for temperatures up to 350° C.

Properties of the consolidated particulate pack may be assessed. In some embodiments, assessment includes at least one of core flooding to assess the permeability of the particulate pack and a compressive strength test to assess the unconfined compressive strength (UCS). The UCS may be assessed by placing a cylindrical core consolidated by the chemical system on a press, increasing a mechanical load to the core face, and recording applied load pressure at which the core breaks (the UCS).

In one example of process 200, the particulate sample includes 20 grams of sand, and the sample is saturated with about 4 mL of a chemical system formed by combining bis-phenol A epichlorohydrin, 4, 4'-diaminodiphenyl sulfone, and methanol in a volume ratio of 1:1:2. Diesel is used as a pre- and post-flush. After heating for 48 hours, the resulting consolidated sand pack had a UCS of 1050 psi and a permeability of 1.5 md.

Figure 3:
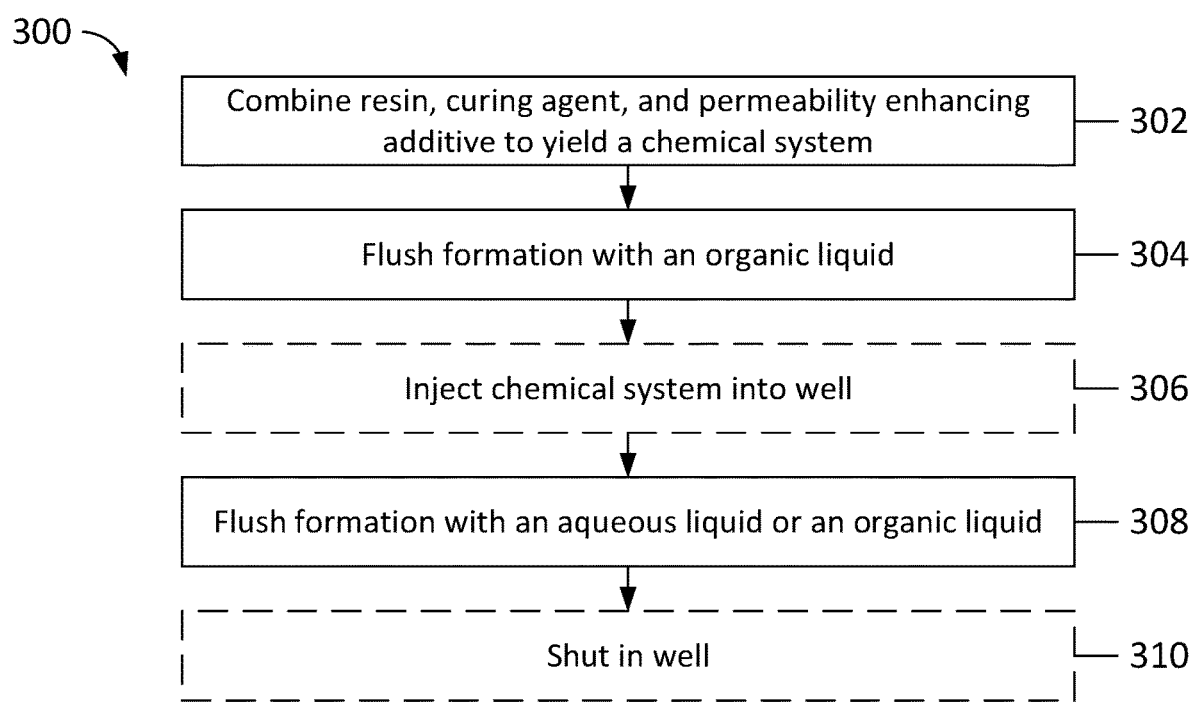
FIG. 3 is a flowchart of an example of a process for pumping the chemical system into a formation.

FIG. 3 is a flowchart of an example of a process 300 for pumping a chemical system into a formation to consolidate particulates in the formation. In 302, resin, curing agent, and permeability enhancing agent are combined to yield the chemical system, described with respect to FIG. 1. The chemical system is a polymerizable composition. In 304, the formation is optionally flushed (pre-flushed) with an organic liquid, such as an organic liquid described with respect to FIG. 2. In some embodiments, the formation is flushed with the organic liquid at a rate of 1 to 3 barrels per minute for a volume of 10 gallons per linear foot of the formation along the wellbore. In 306, the chemical system is injected into the well. In some embodiments, the chemical system is injected into the well at a volume of 5 to 20 gallons per foot, at the rate of 1 to 3 barrels per minute. In 308, the formation is optionally flushed (post-flushed) with an aqueous liquid or an organic liquid, such as those described with respect to FIG. 2. In some embodiments, the formation is flushed with diesel. In certain embodiments, the formation is flushed with diesel at 15 to 60 gallons per foot at 1 to 3 barrels per minute.

In 310, the well is shut in for a length of time selected based on the temperature of the formation. In one example, for a formation temperature of at least 60° C., the well is shut in for at least 168 hours. In another example, for a formation temperature of at least 90° C., the well is shut in for at least 48 hours.

Thus, particular implementations of the subject matter have been described. Other implementations are within the scope of the following claims.

What is claimed is:

1. A method of consolidating particulates in a subterranean formation, the method comprising:
    injecting a polymerizable chemical system comprising bis phenol A epichlorohydrin, 4, 4'-diaminodiphenyl sulfone, and an organic solvent into a wellbore in a subterranean formation, wherein the organic solvent comprises methanol, ethanol, acetone, toluene, xylene, propanol, isopropanol, or any combinations thereof;
    polymerizing the polymerizable chemical system to consolidate particulates in the formation, thereby yielding a consolidated particulates pack wherein the consolidated particulates pack is porous; and
    increasing a concentration of the organic solvent in the polymerizable chemical system and thereby increasing permeability of the consolidated particulates pack, wherein the concentration of the organic solvent in the polymerizable chemical system by volume is in a range of 50% to 80%.

2. The method of claim 1, further comprising flushing the subterranean formation with a liquid pre-flush composition before providing the polymerizable chemical system to the subterranean formation, wherein the liquid pre-flush composition comprises an organic liquid.

3. The method of claim 2, wherein the organic liquid comprises decane, dodecane, kerosene, diesel, or mineral oil.

4. The method of claim 3, wherein the organic liquid comprises diesel.

5. The method of claim 1, further comprising flushing the subterranean formation with a liquid post-flush composition after providing the polymerizable chemical system to the subterranean formation, thereby displacing the chemical system in the formation, wherein the liquid post-flush composition comprises an organic liquid or an aqueous liquid comprising water or brine.

6. The method of claim 1, comprising flushing the subterranean formation with a liquid post-flush composition after providing the polymerizable chemical system to the subterranean formation, thereby displacing the chemical system in the formation, wherein the liquid post-flush composition comprises an aqueous liquid or an organic liquid comprising diesel.

7. The method of claim 1, comprising:
    specifying a length of time to shut in a well comprising the consolidated particulates pack in the subterranean formation, the length of time correlative with a temperature of the subterranean formation; and
    shutting in the well for the length of time specified.

8. The method of claim 7, wherein the length of time is at least 168 hours, and wherein the temperature of the subterranean formation is at least 60° C.

9. The method of claim 7, wherein the length of time is at least 48 hours, and wherein the temperature of the subterranean formation is at least 90° C.

10. The method of claim 1, wherein the particulates comprise at least one of sand, carbonate particles, clay particles, anhydrite, barite, and oxides of iron, calcium, and magnesium.

11. The method of claim 1, wherein polymerizing the polymerizable chemical system yields a compound represented by the following formula:
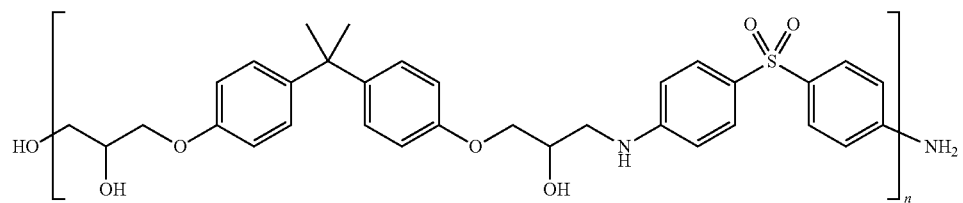
where n is an integer in a range of 5 to 25.
* * * * *

UNITED STATES PATENT AND TRADEMARK OFFICE
CERTIFICATE OF CORRECTION

PATENT NO. : 10,876,037 B2
APPLICATION NO. : 15/969286
DATED : December 29, 2020
INVENTOR(S) : Chang et al.

Page 1 of 1

It is certified that error appears in the above-identified patent and that said Letters Patent is hereby corrected as shown below:

In the Claims

Column 8, Lines 14-15 (approx.), Claim 1, delete "bis phenol" and insert -- bis-phenol --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*